United States Patent [19]

Peterson et al.

[11] Patent Number: 5,428,718
[45] Date of Patent: Jun. 27, 1995

[54] TESSELLATION SYSTEM

[75] Inventors: John Peterson, Palo Alto; Hsuen C. Ho, Cupertino, both of Calif.

[73] Assignee: Taligent, Inc., Cupertino, Calif.

[21] Appl. No.: 7,952

[22] Filed: Jan. 22, 1993

[51] Int. Cl.⁶ .............................................. G06F 15/10
[52] U.S. Cl. .................................................... 395/123
[58] Field of Search ..................... 395/121, 123, 126

[56] References Cited

U.S. PATENT DOCUMENTS

| | | | |
|---|---|---|---|
| 3,658,427 | 4/1972 | DeCou | 356/156 |
| 3,881,605 | 5/1975 | Grossman | 214/1 CM |
| 3,889,107 | 6/1975 | Sutherland | 395/123 X |
| 4,082,188 | 4/1978 | Grimmell et al. | 209/73 |
| 4,635,208 | 1/1987 | Coleby et al. | 364/491 |
| 4,646,251 | 2/1987 | Hayes et al. | 395/123 |
| 4,677,576 | 6/1987 | Berlin, Jr. et al. | 364/522 |
| 4,704,694 | 11/1987 | Czerniejewski | 364/513 |
| 4,742,356 | 5/1988 | Kuipers | 342/448 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,912,659 | 3/1990 | Liang | 395/123 X |
| 4,930,092 | 5/1990 | Reilly | 395/123 |
| 4,939,648 | 7/1990 | O'Neill et al. | 364/422 |
| 4,941,114 | 7/1990 | Shigyo et al. | 395/123 X |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,163,126 | 11/1992 | Einkauf et al. | 395/123 |
| 5,168,441 | 12/1992 | Onarheim et al. | 364/146 |
| 5,177,685 | 1/1993 | Davis et al. | 364/443 |
| 5,181,162 | 1/1993 | Smith et al. | 364/419 |
| 5,278,948 | 1/1994 | Luken, Jr. | 395/123 |
| 5,278,949 | 1/1994 | Thayer | 395/126 |
| 5,315,537 | 5/1994 | Blacker | 395/123 X |

OTHER PUBLICATIONS

"Estimating Subdivision Depths for Rational Curves and Surfaces," by F. Cheng, ACM Transactions on Graphics, vol. 11, No. 2, Apr. 1992, pp. 140-151.
"Patch Work," by R. Cook, Technical Memo #118, Computer Division, Lucasfilm Ltd. (date unknown).
"Adaptive Forward Differencing for Rendering Curves and Surfaces," by S. Lien et al., Computer Graphics, vol. 21, No. 4, Jul. 1987, pp. 111-118.
"Rendering Trimmed NURBS with Adaptive Forward Differencing," by M. Shantz et al., Computer Graphics, vol. 22, No. 4, Aug. 1988, pp. 189-198.
"Rational B-Splines for Curve and Surface Representation," by W. Tiller, IEEE CG&A, Sep. 1983, pp. 61-69.
"F19: Splines:bartels.c.§," by R. Bartels, Mar. 21, 1990.
"Real-Time Rendering of Trimmed Surfaces," by A. Rockwood et al., Computer Graphics, vol. 23, No. 3, Jul. 1989, pp. 107-116.

Primary Examiner—Mark K. Zimmerman
Attorney, Agent, or Firm—Keith Stephens

[57] ABSTRACT

A method and apparatus for tessellating a three-dimensional spline surface into shards operates on a surface which can be separated into columns having a series of subpatches. Each column is processed by performing a series of evaluations upon each of the subpatches of the column. Such evaluations include continuity between subpatches, visibility of subpatches and granularity for discretization of the subpatches and the results are stored within caches. Once the evaluations are completed, a grid which holds the discretized points of each subpatch, is computed by dynamic selection of an algorithm. Thereafter, any cracks between subpatches of the column and between columns are removed. Ultimately, the column is rendered for display. Each of the columns is handled in the same manner so as to ultimately render a set of adjacent columns that form the two-dimensional representation.

24 Claims, 7 Drawing Sheets

TESSELLATION SYSTEM

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATION

This patent application is related to the patent application entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FIELD OF THE INVENTION

This invention generally relates to a system which converts three-dimensional surfaces into two-dimensional illustrations, and more particularly, to a system which economically converts three-dimensional spline surfaces into a series of shards that represent a two-dimensional figure.

BACKGROUND OF THE INVENTION

Tessellation is the process of decomposing a three-dimensional curved surface into small discrete triangles which are referred to as shards. The size of each shard is determined by the screen space projection of the representation.

Tessellation refers to the process of breaking a high level surface description, such as a curved surface, mesh or fractal, into simple two-dimensional representations. A tessellator for a particular type of geometry contains routines for separating that particular geometry into renderable shards.

Samples are actual points on the surface of an object which is being tessellated. Each sample is one of three types of points: (i) a three-dimensional point on the surface, (ii) a normal, and (iii) a parametric coordinate of the object. Device specific samples contain additional information such as color and fixed point screen coordinates. A shard is formed by simply linking a set of three samples for a given area of a surface.

Current graphic systems undertake a complex and lengthy process, usually involving the large amounts of computation, in order to convert a three-dimensional surface into a two-dimensional display. This follows since current methods employ approaches that result in the creation and utilization of different and redundant code for various geometric primitives. Such graphic systems also may depict cracks or require costly computationally intensive techniques to remove the cracks between different areas of the same surface areas and between similar surfaces which are joined together. Thus, the prior art that applicant is aware of provides a graphic system that is inefficient for rendering two-dimensional representations from three-dimensional surfaces.

SUMMARY OF THE INVENTION

The present invention overcomes the aforementioned deficiencies of the prior art by providing a method and apparatus for converting three-dimensional surfaces into two-dimensional representations through the formation and execution of specified conversion programs.

The present invention consists of a system that converts three-dimensional spline surfaces, which are separated into columns having a series of subpatches, into shards. This is accomplished by undertaking a series of evaluations upon each of the subpatches of a selected column. The intermediate results of such evaluations are stored within caches. Such evaluations include continuity between subpatches, visibility of subpatches and granularity for discretization of the subpatches. Once the evaluations are completed, a grid which holds the discretized points of each subpatch, is computed by dynamic selection of an algorithm. Thereafter, any crack between subpatches of the selected column or between the selected column and the previously selected column are removed. Ultimately, the previously selected column is rendered for illustration. Each of the columns is handled in the same manner so as to ultimately render a set of adjacent columns that form the two-dimensional representation.

The invention also provides a method for removing portions of a surface that is either facing away from a viewer or outside of the display screen. This method only requires the examination of the basic surface specification.

Unlike the methods employed by the prior art, the present invention renders a two-dimensional representation that is free of cracks and redundant operations.

DETAILED DESCRIPTION OF THE INVENTION

COMPUTER SYSTEM

Figure 1:
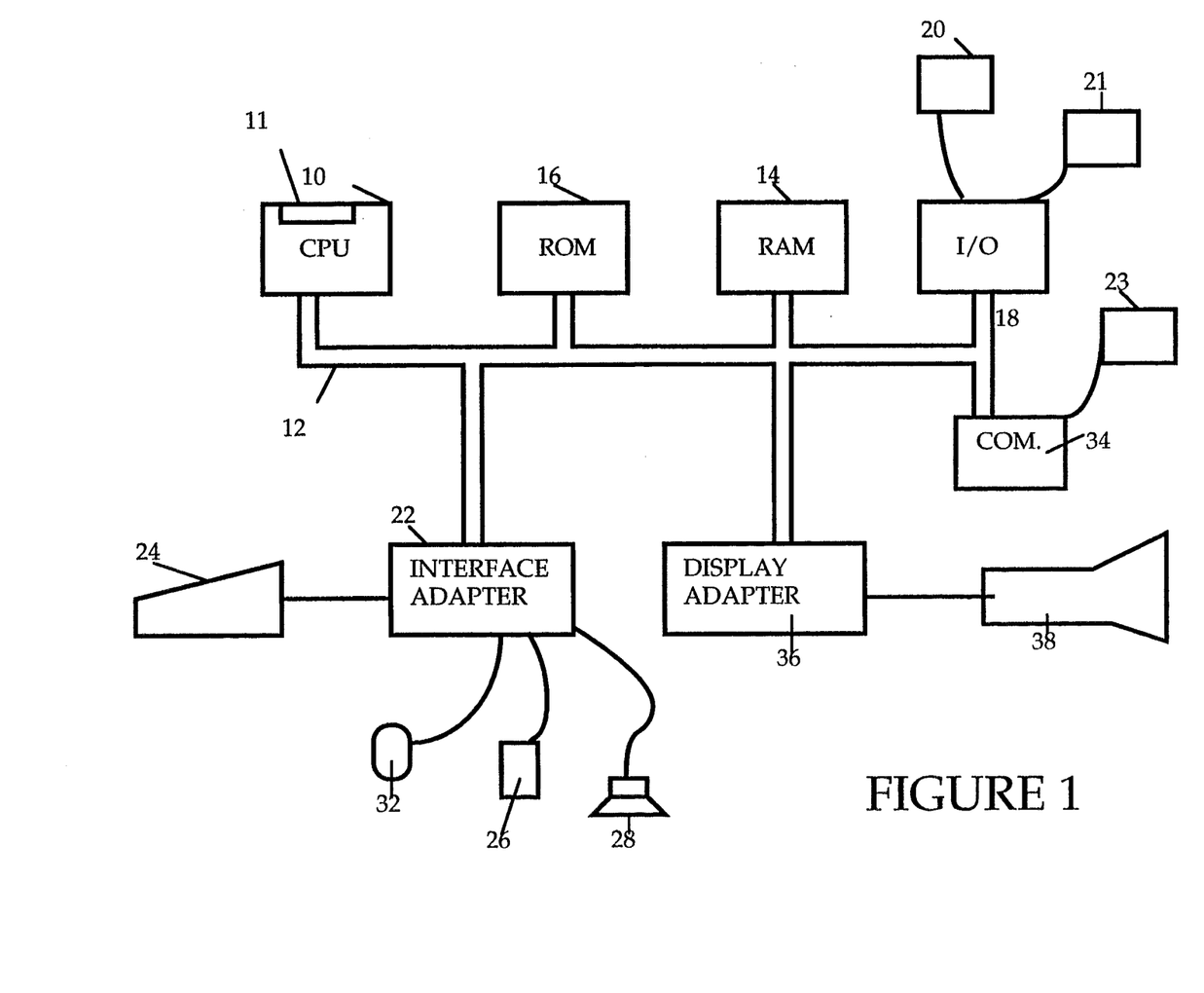
FIG. 1 is a block diagram of a computer system in accordance with the present invention.

A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapted 36 for connecting the bus 12 to a display device 38.

INPUT PARAMETERS

The present invention operates on Non-Uniform Rational B-Spline (hereinafter "NURB") surfaces. The tessellator operates on NURB surfaces. A NURB surface is defined by the formula:

$$F(u,v) = \frac{\sum_{i=0}^{m} \sum_{j=0}^{n} V_{i,j} B_{i,k}(u) B_{j,l}(v)}{\sum_{i=0}^{m} \sum_{j=0}^{n} w_{i,j} B_{i,k}(u) B_{j,l}(v)}$$

$$B_{i,1}(u) = \begin{cases} 1 & u_i \leq u < u_{i+1} \\ 0 & \text{otherwise} \end{cases}$$

$$B_{i,r}(u) = \frac{u - u_i}{u_{i+r-1} - u_i} B_{i,r-1}(u) + \frac{u_{i+r} - u}{u_{i+r} - u_{i+1}} B_{i+1,r-1}(u) \bigg|_{r=2,3,...,k}$$

The variables u and v denote the parameters of the surface. The variables $v_{i,j}$ and $w_{i,j}$ represent the x×m array of control points and rational weights, respectively. The functions $B_{i,k}(u), B_{i,l}(v)$ are the B-spline blending functions of order k and l having knot vectors $\{u_p\}_{p=0}^{n+k-1}$ and $\{v_q\}_{q=0}^{m+l-1}$, respectively.

The present invention operates by dividing each NURB surface into subpatches. Each NURB surface is divided into subpatches by the positioning of the knot vectors. A subpatch is defined as the parametric interval in the knot vector extending from $u_i$ to $u_{i+1}$ (where $u_i < u_{i+1}$) and extending from $v_i$ to $u_{i+1}$ (where $v_i < v_{i+1}$).

Figure 2A:
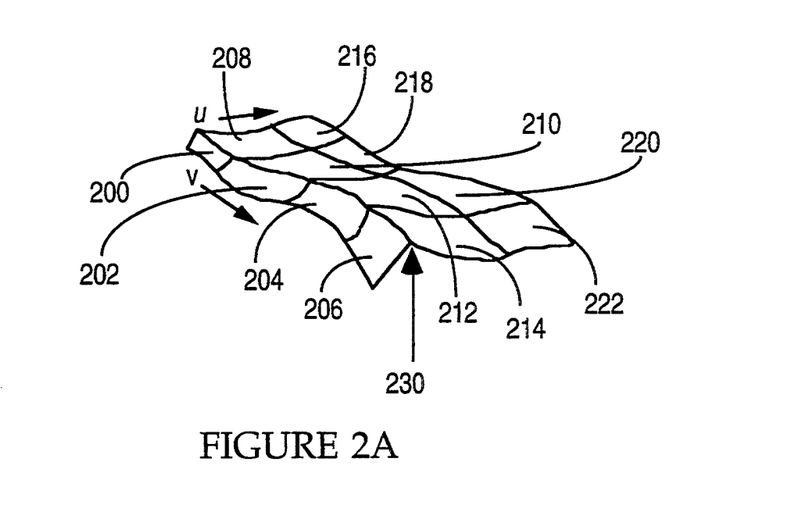
FIG. 2A illustrates a two-dimensional illustration of a NURB having twelve subpatches in accordance with the subject invention.

For instance, a NURB surface may have a knot vector in u of {0,0,0,1,1,2,3,3,3} and a knot vector in v of {0,0,0,1,2,3,4,4,4}. Referring to FIG. 2A, such a NURB surface is illustrated. The resulting twelve subpatches are referred to with reference numerals 200, 202, 204, 206, 208, 210, 212, 214, 216, 218, 220, and 222. It should be noted that a parametric discontinuity, such as discontinuity 230, can only occur at subpatch boundaries.

Figure 2B:
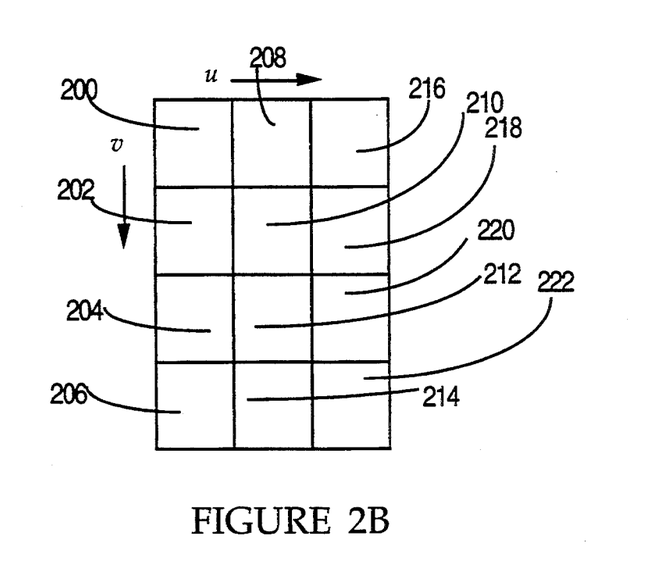
FIG. 2B illustrates the surface parameter space of a NURB surface having twelve subpatches in accordance with the subject invention.

Referring to FIG. 2B, the surface parameter space of the NURB surface is graphically illustrated. Since the knot vector in u reaches four, five knot vectors are formed in parallel to the u vector. Accordingly, four rows of subpatches are formed in perpendicular to the u vector, that is, in the v direction. The four rows of subpatches across in the v direction have intervals between 0 and 1, 1 and 2, 2 and 3, and 3 and 4. In contrast, four knot vectors are formed in perpendicular to the v vector direction since the knot vector in v reaches three. This translates into the formation of three columns of subpatches in perpendicular to the v vector, that is, in the u direction. The resulting three columns of subpatches across the u direction have intervals between 0 and 1, 1 and 2, and 2 and 3. The combinations of four rows and three columns yields the aforementioned twelve subpatches.

In addition to the surface input parameters, the present invention also accepts the following input parameters: (a) the resolution of the display screen; (b) a three-dimensional transformation matrix to convert the three-dimensional surface coordinates into two-dimensional screen coordinates; (c) clipping information to determine if a three-dimensional coordinate will be outside of the two-dimensional screen display area; and (d) a flag indicating whether or not backfacing portions of surfaces may be culled.

GENERAL LOGIC OPERATION

The present invention operates by analyzing the three-dimensional surface in a number of steps. First, a column of subpatches is selected. Columns are selected from left to right in the parameter space of the surface. Second, each subpatch within the column is analyzed. The result of the analysis is the computation of a set of grids which correspond to the set of subpatches within the column. A grid is a rectangular array of discretized points on a surface. A crack is a separation or gap between a mesh of shards. A shard is a triangular portion of a surface with a set of vertices defined by a set of discretized points on the surface. The set of grids are subsequently removed of any: (i) cracks as between each subpatch in the column, and (ii) cracks as between the selected column and the previously selected column (the column to the left of the currently selected column). Since the present invention generates columns of grids from left to right, a particular column of grids can only be drawn when its neighboring column(s) have been computed. Thus, after computation of the grids for the selected column, the previous column of grids is drawn. Thereafter, the adjacent right column of subpatches is selected and the entire process is repeated.

Figure 3A:
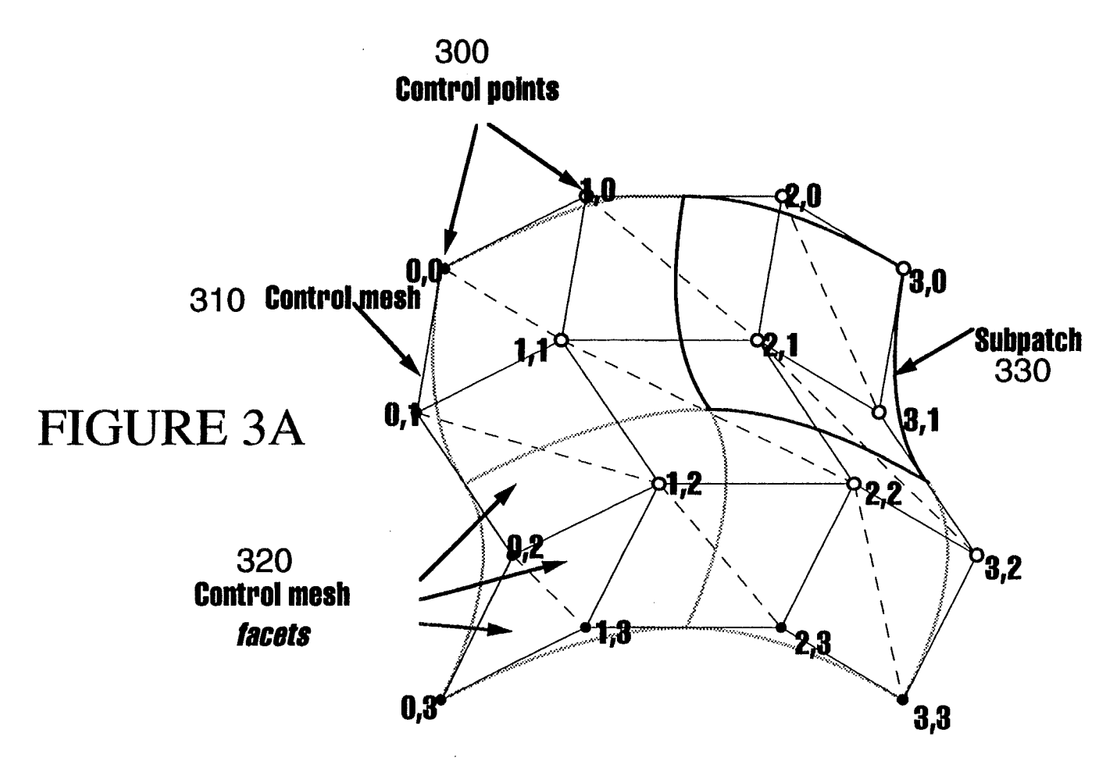
FIG. 3A illustrates a two-dimensional surface with control points and a control mesh in accordance with the subject invention.
Figure 3B:
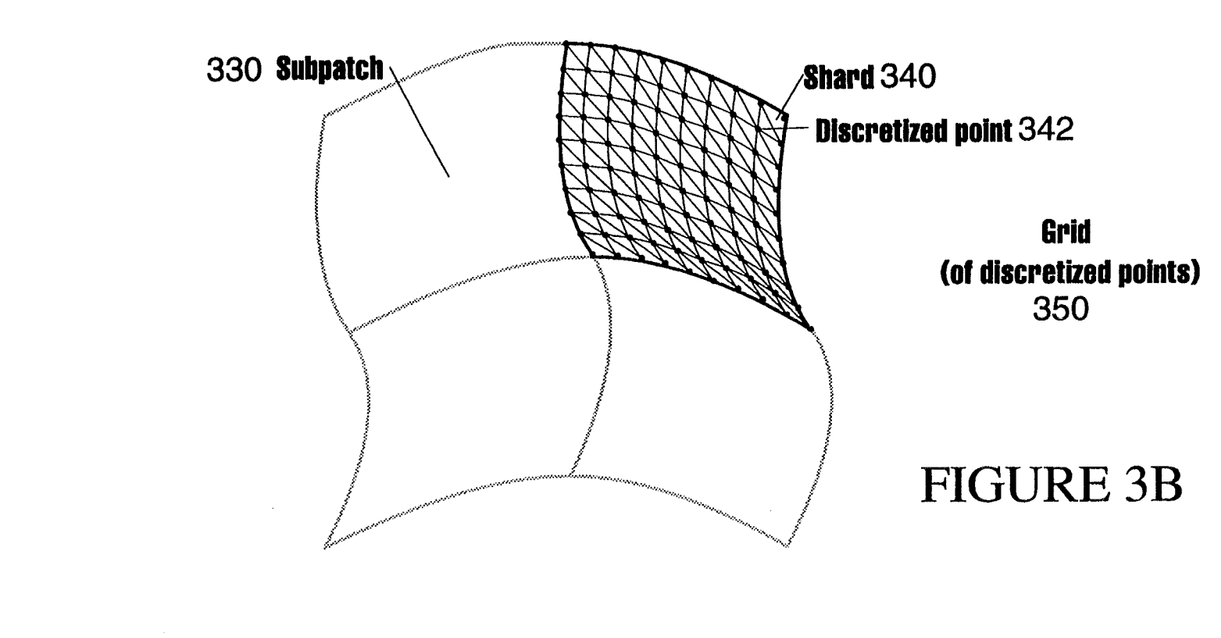
FIG. 3B illustrates a two-dimensional surface with a shard, discretized point, grid and subpatch in accordance with the subject invention.

FIG. 3A illustrates a two-dimensional surface with control points and a control mesh and FIG. 3B illustrates a two-dimensional surface with a shard, discretized point, grid and subpatch in accordance with the subject invention. The control points 300 and 302 define the dimensions of the control mesh 310 and the control mesh facets 320. Examples of subpatches are also provided at 330. A shard is presented at 340 and is defined by a set of discretized points 342. A grid of discretized points is also illustrated at 350.

Figure 4:
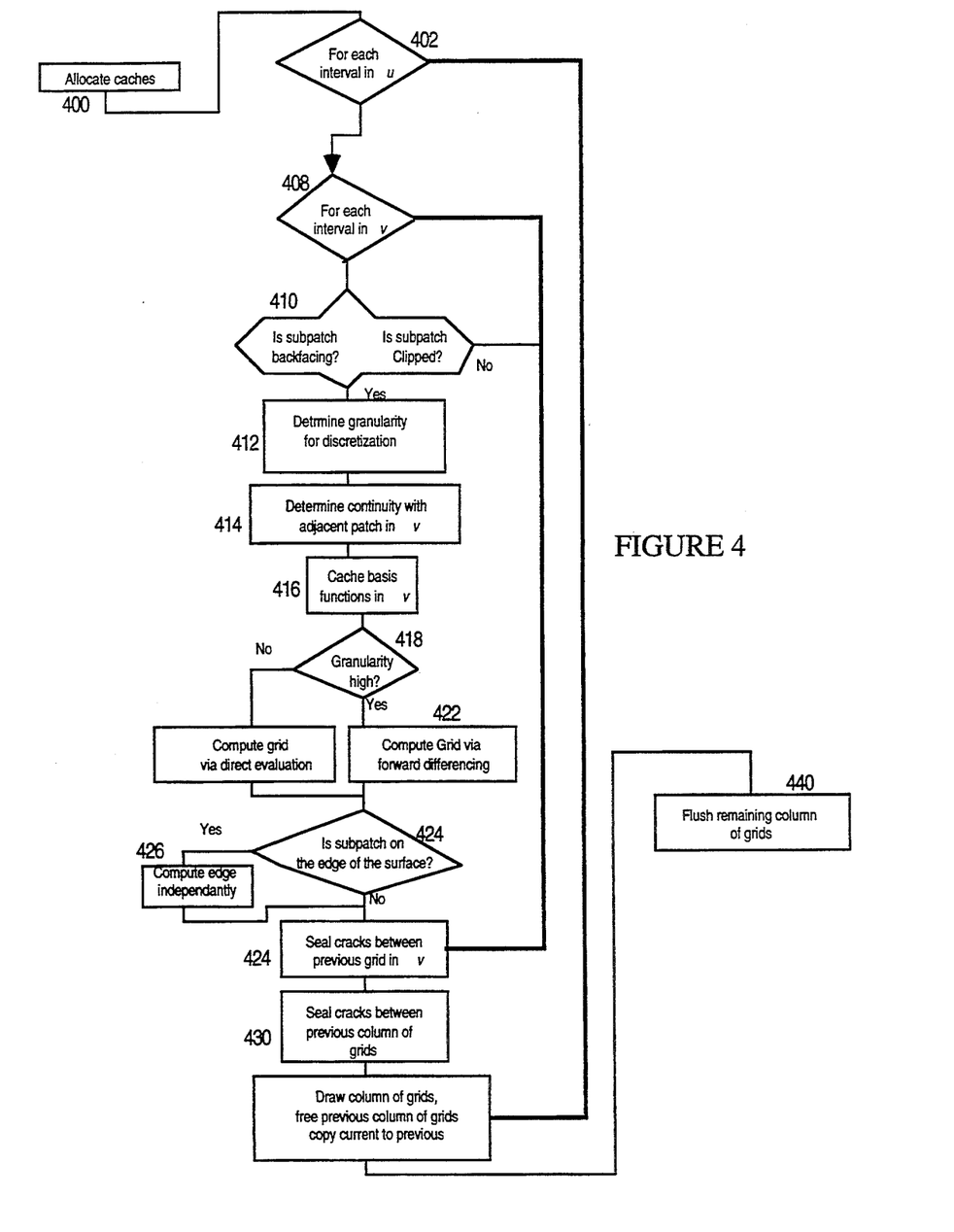
FIG. 4 illustrates a flowchart of the logic operation of the present invention.

Referring to FIG. 4, a flowchart of the logic operation of the present invention is illustrated. Initially, as indicated by logic block 400, caches are allocated for storing intermediate results. Thereafter, as indicated by block 402, an interval in the u direction is selected. Intervals in the u direction are selected from left to right, that is, in order in which they appear from the origin of the u vector. For instance, the NURB surface shown in FIGS. 2 and 3 would first be selected and analyzed with respect to the interval between 0 and 1. Such interval contains subpatches 200, 202, 204 and 206. The NURB surface would subsequently be selected and analyzed with respect to the interval between 1 and 2, and then ultimately with respect to the interval between 2 and 3.

Once a column composing an interval in the u direction has been selected, each interval in the v direction which exists within the selected interval in the u direction is analyzed. Accordingly, a subpatch within the selected column is selected in incremental order from the v vector. This is denoted by block 408. For instance, subpatch 200 of the NURB surface shown in FIGS. 2 and 3 would first be selected and analyzed when the interval in the u direction between 1 and 2 of the NURB surface has been selected. Subsequently, subpatches 202, 204 and 206, in that order, would be analyzed. Hence, the selection of subpatches is a nested loop within the selection of an interval in the u direction.

The selected subpatch is first analyzed to determine whether the subpatch is visible. That is, determination is made as to whether (i) the subpatch is backface culled, or (ii) whether the subpatch is clipped from the display. This is indicated by block 410. An affirmative determination of backface culling or clipping leads the flow of control to block 408 wherein a subsequent subpatch is selected and thereafter analyzed.

When it is determined that the selected subpatch is not backface culled or clipped, then, the flow of control leads to further analysis of the already selected subpatch by block 412 through block 428. Block 412 represents a determination of granularity for the discretization of the selected subpatch. Once granularity is determined, the continuity of the subpatch with its adjacent subpatch within the selected column is determined. This is indicated by block 414. Continuity is determined as between the selected subpatch and the adjacent subpatch in the v direction. In other words, continuity is determined between the selected subpatch and the next subpatch to be selected within the logic of block 408. Upon a determination of continuity, the cache basis functions of the subpatch are determined as indicated by block 416.

Still further analysis of the selected subpatch includes determination of (i) the existence of a high granularity of discretization as indicated by block 418, and (ii) the position of the subpatch with respect to the edges of the surface as indicated by block 424. A determination of a high granularity of discretization directs that the grid of discretized points for the subpatch be computed by a forward differencing algorithm. Such is indicated by block 422. In contrast, a determination that the granularity of discretization is low results in the grid of discretized points of the subpatch being determined by a direct evaluation algorithm. This is denoted by block 420.

Once the grid of discretized points of the selected subpatch has been computed, either by forward differencing or direct evaluation, a determination of the position of the subpatch with respect to the edges of the surface is undertaken. This is indicated by block 424. If the subpatch is on the edge of the surface, then the edge is computed independently as indicated by block 426 and control passes to function block 428. If no portion of the subpatch is determined to be along the surface, then the flow of control leads directly to block 428.

Block 428 calls for the sealing of all cracks existing between the grid formed from the selected subpatch and the grid formed from the previously selected subpatch. That is, the sealing of any crack as determined by block 414 is implemented. Thereafter, the flow of control returns to block 408 for selection of a subsequent subpatch within the interval selected by block 402.

Once each subpatch within the column selected by block 402 has been analyzed, the selected interval is determined for continuity as between itself and the adjacent interval in the u direction that was previously selected and analyzed. This is indicated by block 404. For instance, the interval in the u direction between 2 and 3 of the NURB surface, as illustrated in FIGS. 2 and 3, would be analyzed for continuity as between it and the interval in the u direction between 1 and 2.

After a determination of continuity between the selected column and the previously selected column, all determined cracks are sealed. This is indicated by block 424. Since the previously selected column has now been removed of cracks shared with both of its adjacent columns, the column of grids for the previously selected column is drawn. In addition, the column of grids just computed now becomes the previous column with regard to future analysis upon a newly selected column. This is indicated by block 430. Thereafter, the flow of control is remanded to block 402 wherein an adjacent column in the u direction is selected for analysis.

Since the tessellator processes the subpatches one interval at a time, crack prevention and output of the first column can only occur when at least two columns are generated. It follows that the output is always one column behind the computation or generation of a column of grids. Accordingly, the previously generated column of grids, for which a rendering now exists, is flushed as indicated by block 440.

DETAILED LOGIC OPERATION OF THE PRESENT INVENTION

Various applications invoke the present invention for tessellation of surfaces. Three dimensional modeling and computer automated design ("CAD") applications are examples of applications that invoke a the present invention. Such applications form a control mesh defining a three-dimensional surface that is sought to be tessellated.

Figure 5:
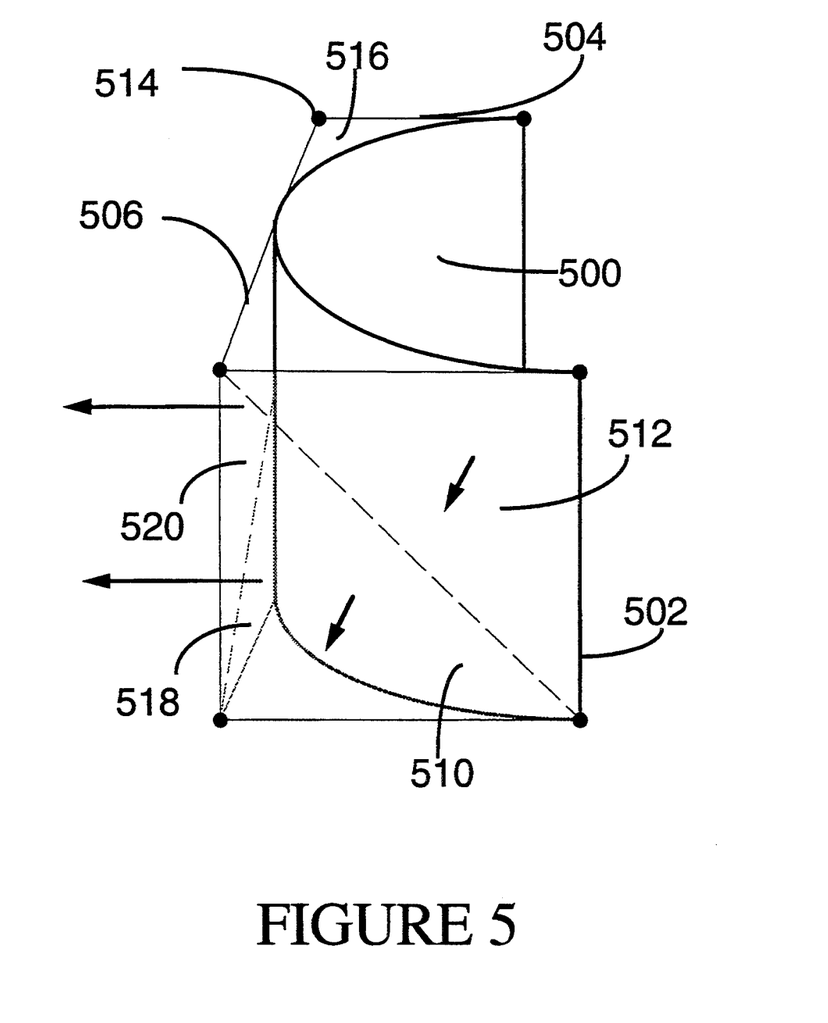
FIG. 5 illustrates a three-dimensional surface with its accompanying control mesh.

Referring to FIG. 5, a three-dimensional surface is illustrated with its control mesh. The three-dimensional surface 500 has a control mesh which has frontal facet 502, rear facet 504, and side facet 506. Frontal facet 502 of the control mesh is composed of lower triangle 510 and upper triangle 512. Rear facet 504 of the control. mesh has lower triangle 514 and upper triangle 516. Side facet 506 of the control mesh has lower triangle 518 and upper triangle 520.

Upon receiving input parameters, the present invention allocates various information within caches. The caches are employed to store intermediate result of various evaluations. The following caches are formed. First, a cache of integer breakpoint intervals which are the indices into the knot vectors that mark the boundaries between the subpatches is formed. This avoids subsequent determinations of subpatch boundaries. Second, caches for the basis functions of the splines in u and v, and their derivatives are also formed. Since the basis functions are constant across the surface of a particular value of u or v, redundant computation is avoided by formation of this cache. Third, a cache is formed to retain the transformed control points of one subpatch. This cache will be utilized for subsequent culling and clipping tests. Fourth, a cache is formed to retain two columns of computed grids. Each grid is composed of the discretized points of a subpatch. The shards, for a particular subpatch, are then rendered from the discretized points of the grid which correspond to the subpatch.

Once all the caches are formed, the present invention transforms all of the surface control points by the three-dimensional transformation matrix. Thereafter, the present invention selects a first interval in the u direction. The first interval is in essence a column. Each subpatch of the selected column is then analyzed to ultimately generate a column of subpatches with no cracks as between the subpatches of the column.

The present invention initially analyzes each subpatch to determine if the subpatch is visible. A subpatch is visible unless it is backface culled or completely clipped from the display screen. Backface refers to portions of the surface which are facing away from a viewer after the surface has been transformed for viewing on the display.

The evaluation of backfacing is carried out by an algorithm that examines portions of the control mesh for backfacing elements. The existence of backfacing is determined by initially inspecting the k×l grid of control points that defines the particular subpatch. The triangles of each set of adjoining control points are then examined with respect to backfacing. in the event that all of the triangular facets of a particular control mesh are backfacing, then the entire subpatch is regarded as backfacing. Consequently, that particular control mesh will not be rendered if backfacing surfaces are to be culled.

During the backfacing analysis of the control mesh facets, two flags are kept. One flag is set to true if any one of the control mesh facets are determined to be backfacing. When any one of the control mesh facets are backfacing, a lower level rendering code must perform backfacing analysis upon each individual shard of the subpatch associated with the facet. The second flag is set to true when all facets of a control mesh are backfacing. When all of the facets are determined to be backfacing, the entire subpatch is ignored if backfacing surfaces are not to be rendered.

After the present invention has undertaken the backfacing analysis, the control points of each subpatch are compared to the clipping fustrum for a desired viewing perspective. An algorithm is employed to determine if the convex hull for a portion of the surface is outside the bounds of the display screen. In the event that the bounding box enclosing the usable display area is not within the bounds of the display screen, then the subpatch is clipped and thus not rendered. As with backfacing evaluations, the present invention identifies and recalls the clipped subpatches so as to avoid redundant tests on individual shards for subsequent renderings.

Subpatches that are determined to be invisible, whether because of being backface culled or completely clipped from the display screen, are denoted by an appropriate flag. The flagged subpatches are not further analyzed with respect to discretization and shading.

After all invisible subpatches are determined, a determination of granularity for discretization is undertaken. Granularity refers to the density of discretized points in the grid. Thus, if the subpatch appears large on the display screen and the subpatch is highly curved, it is likely that the granularity will be high. Conversely, if the surface is relatively small and flat, the granularity will be low.

The present invention makes a granularity determination by examining the magnitude of the second derivative of the surface in both the u and v directions. The measurement of magnitude is taken in a number of places to find the maximum degree of curvature. This parameter is employed as the number of discrete grid samples to be generated for the subpatch. A grid is then allocated for the subpatch that is capable of storing the discretized points.

Upon a determination of granularity, a continuity analysis is performed with regard to each subpatch in the selected column. Each subpatch is analyzed with respect to each of its neighboring subpatch in the column for continuity. The continuity is determined by examining the knot vector in the u and v parameters. The results obtained from the continuity examination are employed during the process of crack prevention to provide for a correct formulation of the seams between the subpatches of a column.

Where the number of rows or columns of control points exceeds the order of the surface in the u or v direction, such surface must be rendered in multiple segments. Each segment is an individual polynomial curve. These segments are joined together with different continuities, which are referred to by the symbol $C_n$. The variable n refers to the order of the continuity. A change in position is a $C_0$ discontinuity; thus a $C_0$ discontinuity is a break in the curve. A change in tangent is a $C_1$ discontinuity; thus a $C_1$ discontinuity is an abrupt change in the slope of a curve. A change in speed is a $C_2$ discontinuity; thus a $C_2$ discontinuity is a change in the speed.

Surfaces having a Bézier knot vector must be treated in a different fashion than other surfaces. This results since a knot vector may indicate a $C_1$ joint even though the control points are co-linear. In this instance, the subpatches should be smoothly joined and the joint marked as $C_2$ continuous. The continuity of the joint is used to guide the crack suppression.

After determining whether the subpatch possessed a high or low granularity, the grid for selected subpatch is computed by either of two algorithms. Initially, the caches for the spline basis value are initialized for the particular subpatch in accordance with the knot vector of the spline. If the large number of samples is required, then a forward differencing algorithm is undertaken. Specifically, forward differencing is employed when the number of samples in the u or v direction, as determined by the granularity measurements, are greater than two times the order of the direction (where k and l are the orders of the u and v surfaces, respectively). Thus, if the granularity measurements determines that the number of samples in u is greater than 2k, or the number of samples in v is greater than 2k, then the forward differencing algorithm is employed. Otherwise, direct evaluation algorithm is employed.

The forward differencing algorithm initially evaluates the k×l points of the subpatch so as to form an array of forward difference values. The points of the array are generated by evaluating a surface column in the v direction. Subsequent columns of points are obtained by forward differencing the forward difference values of the evaluated surface column.

The present invention generates normal vectors from the control mesh by averaging the normals from the triangles surrounding a particular point. The normals of the edges of the surface are, however, computed independently by direct evaluation.

Upon computation of the grid by selection and application of the appropriate algorithm, a determination of whether the subpatch lies on the perimeter of the surface is undertaken. This determination is undertaken to prevent an equivalent edge of two adjacent subpatches from tessellating an equivalent edge differently. Two edges are equivalent if their control points, knot vectors and orders are the same. Thus, the sampling density for all subpatches on the edge of a surface are computed independently.

A final step in the present invention is crack prevention wherein cracks are removed. In the event that the knot vector indicates the existence of a $C_0$ discontinuity (a surface break), no crack prevention is undertaken and the discontinuity is denoted by a flag. Similarly, $C_1$ discontinuities are denoted by a flag so that the code which is implemented to remove cracks ignores these discontinuities. Otherwise, the $C_0$ and $C_1$ discontinuities would be removed to produce an incorrect rendering.

Cracks of each subpatch within a selected column are initially removed. Thereafter, the cracks between the selected column and the previously selected column are determined and removed.

Cracks occur in a rendering when two adjacent subpatches are sampled at different densities. To prevent the cracks, the present invention matches each point of the less dense grid with the points of the dense grid. Points of the more dense grid which are unable to be matched are forced to remain on the line between the edges of the grids.

Figure 6:
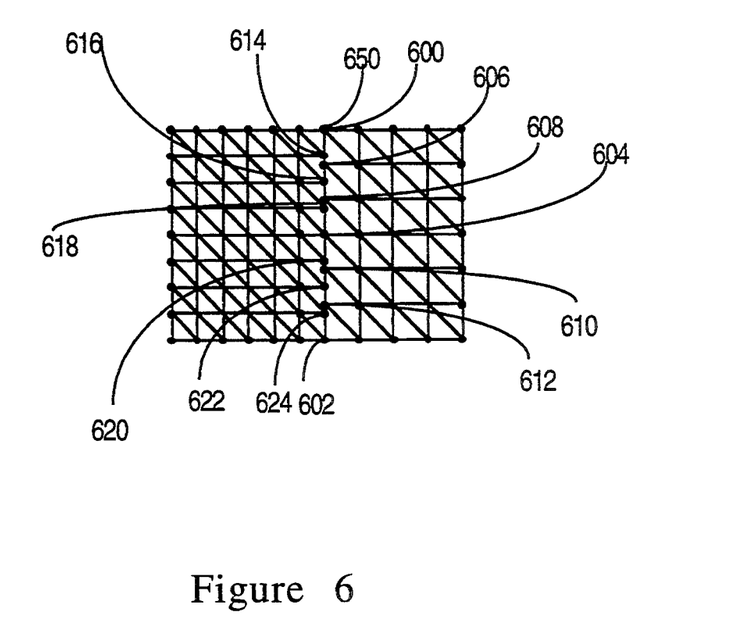
FIG. 6 illustrates adjacent tessellation grids of different densities before crack prevention occurs in accordance with the present invention.

Referring to FIG. 6, adjacent tessellation grids of different densities are illustrated before crack prevention occurs. The edge line 650 which separates the edges of the two grids contains thirteen points. The edge line 650 contains a top shared end point, a bottom shared end point and a shared mid-point, which are referred to by reference numerals 600, 602, and 604 respectively. Four points on the edge line 650, which are referred to by reference numerals 606, 608, 610, and 612, are the unshared edge points of the less dense grid. Six points on the edge line 650, which are referred to by reference numerals 614, 616, 618, 620, 622, and 624, are the unshared edge points of the more dense grid.

Figure 7:
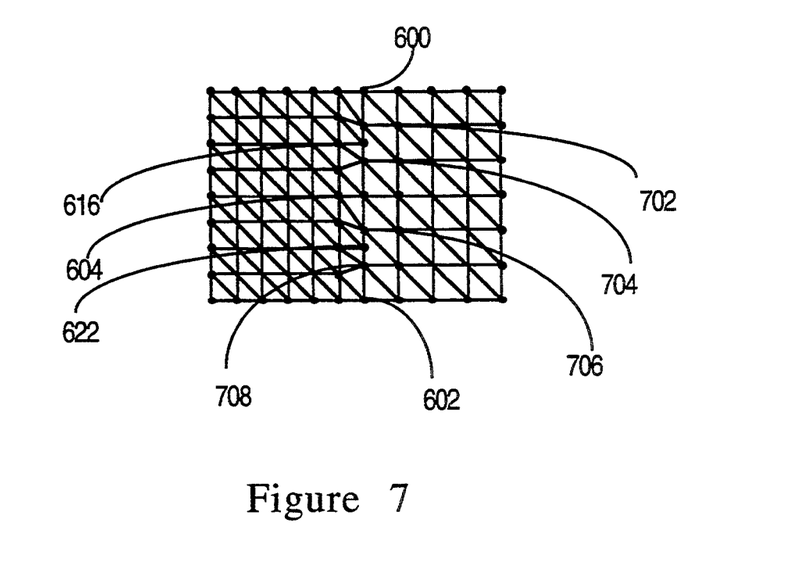
FIG. 7 illustrates adjacent tessellation grids of different densities after crack prevention has occurred in accordance with the present invention.

Referring to FIG. 7, adjacent tessellation grids of different densities are illustrated after crack prevention occurs. After the crack prevention procedure has been undertaken, four shared points are formed upon the edge line 650. Namely, points 606, 608, 610, and 612, which were formerly the unshared edge points of the less dense grid, have been joined with points 614, 618, 620, and 624, which were formerly the unshared edge points of the more dense grid. Accordingly, joined points 702, 704, 706, and 708 are illustrated. Points 616 and 622 are projected to a line as the unshared edge points of the more dense grid.

Given arrays of points "left" and "right" having "numleft" and "numright" points, respectively, the following algorithm is employed for eliminating cracks between these set of points:

```
procedure linkup (left, right: pt_array_t;
numleft, numright: integer);
    var
        i, j, curlnd, lastlnd, minpts: integer;
        curDist, ratio: float;
        minside, maxside: pt_array_t;
        tmp: point_t;
begin
    if numleft < numright then
        begin
            ratio := (numright - 1.0) / (numleft - 1.0);
            minside := left;
            maxside := right;
            minpts := numleft;
        end
    else
        begin
            ratio := (numleft - 1.0) / (numright - 1.0);
            minside := right;
            maxside := left;
            minpts := numright;
```
-continued
```
        end;
    curDist := 0.0;
    curlnd := 0;
    maxside[0] := minside[O];
    for i := 1 to minpts - 1 do
        begin
            curDist := curDist + ratio;
            lastlnd := curlnd;
            curlnd := round(curDist);
            for j := lastlnd + 1 to curlnd - 1 do
                begin
                    tmp := maxside[j];
                    ProjectToLine(minSide[i - 1],
minSide[i], tmp);
                    maxside[j] := tmp;
                end;
            maxside[curlnd] := minside[i];
        end;
end;
```

The crack prevention procedure initially examines the edge line between a first column of grids, which has only one neighboring column, and a second generated column. Once the crack prevention examination has been completed as between the first and second columns, the first column of tessellation grids is rendered. Thereafter, the third column is generated and the edge line between the second column and the third column is examined. Once crack prevention has been completed as between the second and third columns, the second column of grids is rendered. This continues until all edge lines have been examined for crack prevention.

In addition to crack prevention between grids, crack prevention procedures is also employed as between adjacent NURB surfaces. The procedure for examining cracks between NURB surfaces is similar to the aforementioned procedure of crack prevention between grids. Since the surfaces are rendered independently of one another, it is possible for two adjacent surfaces that have an identical edge to tessellate the edge differently.

Ultimately, the previously selected column is rendered. This follows since a column can only be rendered upon generation of itself as well as upon the generation of adjacent columns. Otherwise, crack prevention between the adjacent columns could not take place. The last generated column then replaces the previously generated column for utilization within the evaluation of the next selected column. The aforementioned process is then repeated upon the next column selected. Such repetition continues until all columns have been rendered.

An embodiment of the invention developed by the inventor to render three-dimensional surfaces is provided below to clarify the detailed logic of the present invention.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer implemented method for tessellating a surface which is divided into a plurality of columns, each of the plurality of columns being divided into a plurality of subpatches stored in a memory of said computer and displayed on a display attached to said computer, comprising the steps of:

(a) selecting a column of subpatches from the plurality of columns stored in said memory of said computer for display on said display attached to said computer;

(b) selecting a subpatch from the plurality of subpatches comprising the selected column of subpatches stored in said memory of said computer for display on said display attached to said computer;

(c) determining whether the selected subpatch is visible on said display attached to said computer;

(d) computing a grid of discretized points if the selected subpatch is visible on said display attached to said computer;

(e) removing any cracks between the selected subpatch and a previously selected subpatch by repositioning selected ones of the discretized points stored in said memory of said computer for display on said display attached to said computer; and (f) converting the grid into a plurality of shards stored in said memory of said computer for display upon said display attached to said computer.

2. A method as recited in claim 1, including the steps of:

(a) removing any cracks between the selected subpatch and subpatches in a previously selected column of subpatches by repositioning selected ones of the discretized points stored in said memory of said computer for display on said display attached to said computer; and (b) rendering a shard in said memory of said computer for display on said display of said computer from the plurality of shards in the previously selected column of subpatches.

3. A computer implemented method for tessellating a surface having a plurality of subpatches organized within a plurality of columns in a memory of said computer and displaying the resultant image on a display attached to said computer, comprising the steps of:

(a) selecting a column from the plurality of columns and selecting a subpatch within the selected column stored in said memory of said computer for display on said display attached to said computer;

(b) determining whether the selected subpatch is visible on said display attached to said computer;

(c) evaluating the selected subpatch stored in said memory of said computer for display on said display attached to said computer to determine a point computation algorithm when the selected subpatch is visible on said display attached to said computer;

(d) using the algorithm determined in step (c) to compute a grid of discretized points for the selected subpatch stored in said memory of said computer for display on said display attached to said computer; and (e) removing any crack between the selected subpatch and subpatches in the plurality of columns other than the selected column by repositioning selected ones of discretized points stored in said memory of said computer for display on said display attached to said computer.

4. The method as recited in claim 3, including the step of repeating steps (a) through (e) for each subpatch within the selected column to form a computed column of grids.

5. The method as recited in claim 4, including the steps of:

(a) removing any crack between the selected subpatch and a previously selected column of subpatches by repositioning selected ones of the discretized points stored in said memory of said computer for display on said display attached to said computer; and (b) rendering a plurality of shards in the previously selected column of subpatches stored in said memory of said computer for display on said display attached to said computer.

6. A computer implemented method for tessellating a surface having a plurality of subpatches organized within a plurality of columns, each of the subpatches having a surface with a surface granularity stored in a memory of said computer for display on a display attached to said computer, comprising the steps of:

(a) selecting a column from the plurality of columns and selecting a subpatch within the selected column stored in said memory of said computer for display on said display attached to said computer;

(b) determining whether the selected subpatch is visible on said display attached to said computer;

(c) evaluating the surface granularity of the selected subpatch to determine a point computation algorithm when the selected subpatch is visible on said display attached to said computer;

(d) using the algorithm determined in step (c) to compute a grid of discretized points for the selected subpatch stored in said memory of said computer for display on said display attached to said computer; and (e) removing any crack between the selected subpatch and subpatches in the plurality of columns other than the selected column by repositioning selected ones of the discretized points stored in said memory of said computer for display on said display attached to said computer.

7. A method as recited in claim 6, including the step of repeating steps (a) through (e) for each subpatch within the selected column stored in said memory of said computer so as to form a computed column of grids for display on said display attached to said computer.

8. The method as recited in claim 7, including the steps of:

(a) removing any crack between the selected subpatch and a previously selected column of subpatches by repositioning selected ones of the discretized points stored in said memory of said computer for display on said display attached to said computer;

(b) using the grid points in the subpatches of a previously selected column of subpatches to generate a plurality of shards stored in said memory of said computer for display on said display attached to said computer; and (c) rendering the plurality of shards in the previously selected column of subpatches on said display attached to said computer.

9. A computer implemented method for tessellating a surface having a plurality of subpatches organized within a plurality of columns, each of the subpatches having a surface with a surface granularity stored in a memory of said computer for display on a display attached to said computer, comprising the steps of:

(a) selecting a column from the plurality of columns and selecting a subpatch within the selected column stored in said memory of said computer for display on said display attached to said computer;

(b) determining whether the selected subpatch is visible on said display attached to said computer;

(c) evaluating the surface granularity of the selected subpatch to select either a direct evaluation point computation algorithm or a forward differencing point computation algorithm when the selected subpatch is visible on said display attached to said computer;

(d) using the algorithm determined in step (c) to compute a grid of discretized points for the selected subpatch and storing the points in said memory of said computer for display on said display attached to said computer;

(e) removing any crack between the selected subpatch and a previously selected subpatch in the selected column by repositioning selected ones of the discretized points stored in said memory of said computer for display on said display attached to said computer;

(f) repeating steps (a) through (e) for each subpatch within the selected column so as to form a processed column of subpatches stored in said memory of said computer for display on said display attached to said computer;

(g) removing any crack between the processed column of subpatches and a previously processed column of subpatches by repositioning selected ones of the discretized points stored in said memory of said computer for display on said display attached to said computer;

(h) rendering the previously processed column of subpatches stored in said memory, of said computer for display on said display attached to said computer; and (i) repeating steps (a) through (h) for a column which is adjacent to the selected column but was not previously selected.

10. A computer implemented method for tessellating a surface having a plurality of subpatches organized within a plurality of columns stored in a memory of said computer for display on a display attached to said computer, comprising the steps of:

(a) selecting a column from the plurality of columns and selecting a subpatch within the selected column stored in said memory of said computer for display on said display attached to said computer;

(b) determining whether the selected subpatch is visible on said display attached to said computer;

(c) evaluating the selected subpatch to determine a point computation algorithm when the selected subpatch is visible on said display attached to said computer, (d) using the algorithm determined in step (c) to compute a grid of discretized points for the selected subpatch stored in said memory of said computer for display on said display attached to said computer;

(e) removing any crack between the selected subpatch and subpatches in the plurality of columns other than the selected column by repositioning selected ones of the discretized points stored in said memory of said computer for display on said display attached to said computer;

(f) repeating steps (a) through (e) for each subpatch within the selected column so as to form a processed column of subpatches stored in said memory of said computer for display on said display attached to said computer;

(g) removing any crack between the processed column of subpatches and a previously selected column of subpatches by repositioning selected ones of the discretized points stored in said memory of said computer for display on said display attached to said computer;

(h) rendering the previously selected column of subpatches stored in said memory of said computer for display on said display attached to said computer; and (i) repeating steps (a) through (h) for a column which is adjacent to the selected column but that was not previously selected.

11. A computer implemented method for tessellating a surface stored in ad memory of said computer for display on a display attached to said computer having a plurality of subpatches organized within a plurality of columns stored in said memory of said computer for display on said display attached to said computer, comprising the steps of:

(a) selecting a column from the plurality of columns and selecting a subpatch within the selected column stored in said memory of said computer for display on said display attached to said computer;

(b) determining whether the selected subpatch is visible on said display attached to said computer;

(c) evaluating the selected subpatch to determine a point computation algorithm when the selected subpatch is visible on said display attached to said computer;

(d) using the algorithm determined in step (c) to compute a grid of discretized points for the selected subpatch stored in said memory of said computer for display on said display attached to said computer;

(e) removing any crack between the selected subpatch and subpatches in the plurality of columns other than the selected column by repositioning selected ones of the discretized points stored in said memory of said computer for display on said display attached to said computer;

(f) repeating steps (a) through (e) for each subpatch within the selected column so as to form a processed column of subpatches stored in said memory of said computer for display on said display attached to said computer;

(g) removing any crack between the processed column of subpatches and a previously selected column of subpatches by repositioning selected ones of the discretized points stored in said memory of said computer for display on said display attached to said computer;

(h) rendering the previously selected column of subpatches on said display attached to said computer;

(i) storing the processed subpatches for the selected column in said memory of said computer for display on said display attached to said computer; and (j) repeating steps (a) through (i) for a column which is adjacent to the selected column but that was not previously selected.

12. A computer implemented method for tessellating a surface having a plurality of subpatches stored in a memory of said computer for display on a display attached to said computer organized within a plurality of columns stored in said memory of said computer for display on said display attached to said computer, comprising the steps of:

(a) selecting a column from the plurality of columns and selecting a subpatch within the selected column stored in said memory of said computer for display on said display attached to said computer;

(b) determining whether the selected subpatch is visible on said display attached to said computer;

(c) evaluating the selected subpatch to determine a point computation algorithm when the selected subpatch is visible on said display attached to said computer;

(d) using the algorithm determined in step (c) to compute a grid of discretized points for the selected subpatch stored in said memory of said computer for display, on said display attached to said computer;

(e) removing any crack between the selected subpatch and subpatches in the plurality of columns other than the selected column by repositioning selected ones of the discretized points stored in said memory of said computer for display on said display attached to said computer;

(f) using the grid of discretized points to generate a plurality of shards for display on said display attached to said computer;

(g) rendering the plurality of shards stored in said memory of said computer for display on said display attached to said computer; and (h) displaying the rendered shards on said display attached to said computer.

13. An apparatus for tessellating a surface on a computer with a memory and a display attached to said computer said surface is divided into a plurality of columns, each of the plurality of columns being divided into a plurality of subpatches stored in said memory of said computer for display on said display attached to said computer, comprising:

(a) processor means for selecting a column of subpatches from the plurality of columns stored in said memory of said computer for display on said display attached to said computer;

(b) processor means for selecting a subpatch from the plurality of subpatches comprising selected column of subpatches stored in said memory of said computer for display on said display attached to said computer;

(c) processor means for determining whether the selected subpatch is visible on said display attached to said computer;

(d) processor means for computing a grid of discretized points if the selected subpatch is visible on said display attached to said computer;

(e) processor means for removing any cracks between the selected subpatch and a previously selected subpatch by repositioning selected ones of the discretized points stored in said memory of said computer for display on said display attached to said computer; and (f) processor means for converting the grid into a plurality of shards stored in said memory of said computer for display on said display attached to said computer.

14. An apparatus as recited in claim 13, including:

(a) processor means for removing any cracks between the selected subpatch and subpatches in a previously selected column of subpatches by repositioning selected ones of the discretized points stored in said memory of said computer for display on said display attached to said computer; and (b) processor means for rendering a plurality of shards in the previously selected column of subpatches stored in said memory of said computer for display on said display attached to said computer.

15. An apparatus for tessellating a surface on a computer with a memory and a display attached to said computer, said surface having a plurality of subpatches organized within a plurality of columns stored in said memory of said computer for display on said display attached to said computer, comprising:

(a) processor means for selecting a column from the plurality of columns and selecting a subpatch within the selected column stored in said memory of said computer for display on said display attached to said computer;

(b) processor means for determining whether the selected subpatch is visible on said display attached to said computer;

(c) processor means for evaluating the selected subpatch to determine a point computation algorithm when the selected subpatch is visible on said display attached to said computer;

(d) processor means responsive to the determined point computation algorithm for computing a grid of discretized points for the selected subpatch stored in said memory of said computer for display on said display attached to said computer; and (e) processor means for removing any crack between the selected subpatch and subpatches in the plurality of columns other than the selected column by repositioning selected ones of the discretized points stored in said memory of said computer for display on said display attached to said computer.

16. The apparatus as recited in claim 15, including means for computing a grid of discretized points for each subpatch within the selected column and means for removing any cracks between adjacent subpatches in the selected column to form a processed column of subpatches by repositioning selected ones of the discretized points stored in said memory of said computer for display on said display attached to said computer.

17. The apparatus as recited in claim 16, including:

(a) processor means for removing any crack between the selected subpatch and a previously selected column of subpatches by repositioning selected ones of the discretized points stored in said memory of said computer for display on said display attached to said computer; and (b) processor means for rendering a plurality of shards in the previously selected column of subpatches stored in said memory of said computer for display on said display attached to said computer;

18. An apparatus for tessellating a surface on a computer with a memory and a display attached to said computer having a plurality of subpatches organized within a plurality of columns stored in said memory of said computer for display on said display attached to said computer, each of the subpatches having a surface with a surface granularity stored in said memory of said computer for display on said display attached to said computer, comprising:

(a) processor means for selecting a column from the plurality of columns and selecting a subpatch within the selected column stored in said memory of said computer for display on said display attached to said computer;

(b) processor means for determining whether the selected subpatch is visible on said display attached to said computer;

(c) processor means for evaluating the surface granularity of the selected subpatch to determine a point computation algorithm when the selected subpatch is visible on said display attached to said computer;

(d) processor means responsive to the determined point computation algorithm for computing a grid of discretized points for the selected subpatch stored in said memory of said computer for display on said display attached to said computer; and (e) processor means for removing any crack between the selected subpatch and subpatches in the plurality of columns other than the selected column by repositioning selected ones of the discretized points stored in said memory of said computer for display on said display attached to said computer.

19. An apparatus as recited in claim 18, including means for computing a grid of discretized points for each subpatch within the selected column and means for removing any cracks between adjacent subpatches in the selected column by repositioning selected ones of the discretized points to form a processed column of subpatches stored in said memory of said computer for display on said display attached to said computer.

20. An apparatus as recited in claim 19, including:

(a) processor means for removing any cracks between the selected subpatch and a previously selected column of subpatches by repositioning selected ones of the discretized points stored in said memory of said computer for display on said display attached to said computer; and (b) processor means for rendering a plurality of shards in the previously selected column of subpatches stored in said memory of said computer for display on said display attached to said computer.

21. An apparatus for tessellating a surface on a computer with a memory and a display attached to said computer having a plurality of subpatches organized within a plurality of columns stored in said memory of said computer for display on said display attached to said computer, each of the subpatches having a surface with a surface granularity stored in said memory of said computer for display on said display attached to said computer, comprising:

(a) processor means for selecting a column from the plurality of columns and selecting a subpatch within the selected column stored in said memory of said computer for display on said display attached to said computer;

(b) processor means for determining whether the selected subpatch is visible on said display attached to said computer;

(c) processor means for evaluating the surface granularity of the selected subpatch to determine a point computation algorithm when the selected subpatch is visible on said display attached to said computer;

(d) processor means responsive to the determined point computation algorithm for computing a grid of discretized points for the selected subpatch stored in said memory of said computer for display on said display attached to said computer;

(e) processor means for removing any crack between the selected subpatch and subpatches in the plurality of columns other than the selected column by repositioning selected ones of the discretized points stored in said memory of said computer for display on said display attached to said computer;

(f) processor means for sequentially processing each subpatch within the selected column so as to form a processed column of subpatches stored in said memory of said computer for display on said display attached to said computer;

(g) processor means for removing any crack between the processed column of subpatches and a previously selected column of subpatches stored in said memory of said computer for display on said display attached to said computer;

(h) processor means for rendering the previously selected column of subpatches stored in said memory of said computer for display on said display attached to said computer; and (i) processor means for sequentially rendering a column of subpatches stored in said memory of said computer for display on said display attached to said computer which is adjacent to a selected column but that was not previously selected.

22. An apparatus for tessellating a surface on a computer with a memory and a display attached to said computer having a plurality of subpatches organized within a plurality of columns stored in said memory of said computer for display of said display attached to said computer, comprising:

(a) processor means for selecting a column from the plurality of columns and selecting a subpatch within the selected column stored in said memory of said computer for display on said display attached to said computer;

(b) processor means for determining whether the selected subpatch is visible on said display attached to said computer;

(c) processor means for evaluating the selected subpatch to determine a point computation algorithm when the selected subpatch is visible on said display attached to said computer;

(d) processor means responsive to the determined point computation algorithm for computing a grid of discretized points for the selected subpatch stored in said memory of said computer for display on said display attached to said computer;

(e) processor means for removing any crack between the selected subpatch and subpatches in the plurality of columns other than the selected column by repositioning selected ones of the discretized points stored in said memory of said computer for display on said display attached to said computer;

(f) processor means for sequentially processing each subpatch within the selected column so as to form a processed column of subpatches stored in said memory of said computer for display on said display attached to said computer;

(g) processor means for removing any crack between the processed column of subpatches and a previously selected column of subpatches by repositioning selected ones of the discretized points stored in said memory of said computer for display on said display attached to said computer;

(h) processor means for rendering the previously selected column of subpatches on said display attached to said computer; and (i) processor means for sequentially rendering a column of subpatches stored in said memory of said computer for display on said display attached to said computer which is adjacent to a selected column but that was not previously selected.

23. An apparatus for tessellating a surface on a computer with a memory and a display attached to said computer having a plurality of subpatches organized within a plurality of columns stored in said memory of said computer for display on said display attached to said computer comprising:

(a) processor means for selecting a column from the plurality of columns and selecting a subpatch within the selected column stored in said memory of said computer for display on said display attached to said computer;

(b) processor means for determining whether the selected subpatch is visible on said display attached to said computer;

(c) processor means for evaluating the selected subpatch to determine a point computation algorithm when the selected subpatch is visible on said display attached to said computer;

(d) processor means responsive to the determined point computation algorithm for computing a grid of discretized points for the selected subpatch stored in said memory of said computer for display on said display attached to said computer;

(e) processor means for removing any crack between the selected subpatch and subpatches in the plurality of columns other than the selected column by repositioning selected ones of the discretized points stored in said memory of said computer for display on said display attached to said computer;

(f) processor means for sequentially processing each subpatch within the selected column so as to form a processed column of subpatches stored in said memory of said computer for display on said display attached to said computer;

(g) processor means for removing any crack between the processed column of subpatches and a previously selected column of subpatches by repositioning selected ones of the discretized points stored in said memory of said computer for display on said display attached to said computer;

(h) processor means for rendering the previously selected column of subpatches stored in said memory of said computer for display on said display attached to said computer;

(i) storage means for maintaining the processed subpatches for the selected column in said memory of said computer for display on said display attached to said computer; and (j) processor means for sequentially rendering a column of subpatches stored in said memory of said computer for display on said display attached to said computer which is adjacent to a selected column but that was not previously selected.

24. An apparatus for tessellating a surface on a computer with a memory and a display attached to said computer having a plurality of subpatches organized within a plurality of columns stored in said memory of said computer for display on said display attached to said computer, comprising:

(a) processor means for selecting a column from the plurality of columns and selecting a subpatch within the selected column stored in said memory of said computer for display on said display attached to said computer;

(b) processor means for determining whether the selected subpatch is visible on said display attached to said computer;

(c) processor means for evaluating the selected subpatch to determine a point computation algorithm when the selected subpatch is visible on said display attached to said computer;

(d) processor means responsive to the determined point computation algorithm for computing a grid of discretized points for the selected subpatch stored in said memory of said computer for display on said display attached to said computer;

(e) processor means for removing any crack between the selected subpatch and subpatches in the plurality of columns other than the selected column by repositioning selected ones of the discretized points stored in said memory of said computer for display on said display attached to said computer;

(f) processor means responsive to the grid of discretized points for generating a plurality of shards stored in said memory of said computer for display on said display attached to said computer;

(g) processor means for rendering the plurality of shards on said display attached to said compute; and (h) processor means for displaying the rendered shards on said display attached to said computer.

* * * * *